US012529242B2

(12) United States Patent
Green

(10) Patent No.: US 12,529,242 B2
(45) Date of Patent: Jan. 20, 2026

(54) COMBINATION LOCKING MECHANISM

(71) Applicant: Henry Squire & Sons Holdings Ltd, Wolverhampton (GB)

(72) Inventor: Glyn Green, Ratlinghope (GB)

(73) Assignee: Henry Squire & Sons Holdings Ltd (GB)

( * ) Notice: Subject to any disclaimer, the term of this patent is extended or adjusted under 35 U.S.C. 154(b) by 170 days.

(21) Appl. No.: 18/523,506

(22) Filed: Nov. 29, 2023

(65) Prior Publication Data

US 2024/0183193 A1 Jun. 6, 2024

(30) Foreign Application Priority Data

Dec. 2, 2022 (GB) .................................... 2218134

(51) Int. Cl.
*E05B 37/02* (2006.01)
*E05B 37/00* (2006.01)

(52) U.S. Cl.
CPC .......... *E05B 37/02* (2013.01); *E05B 37/0017* (2013.01)

(58) Field of Classification Search
CPC ... E05B 37/02; E05B 37/0012; Y10T 70/7305
USPC .................................... 70/312, 284, 285, 30
See application file for complete search history.

(56) References Cited

U.S. PATENT DOCUMENTS 148,451 A * 3/1874 Hall ...................... E05B 1/0053 70/330
972,171 A * 10/1910 Dupont ............... E05B 37/0034 70/285
3,732,711 A * 5/1973 Albert .................. E05B 17/145 70/425
5,119,650 A 6/1992 Lo
6,708,534 B1 * 3/2004 Ruan ..................... E05B 37/025 70/284
6,799,445 B1 * 10/2004 Tsai ...................... E05B 37/025 70/284
7,104,095 B1 * 9/2006 Lin .................... A44B 11/2573 70/284
7,568,367 B2 * 8/2009 Huang ................ E05B 37/0034 70/284
8,272,242 B1 * 9/2012 Lee ..................... E05B 37/0058 70/284
8,776,556 B2 * 7/2014 Lai ........................ E05B 37/025 70/284

(Continued)

FOREIGN PATENT DOCUMENTS

GB 2598321 A 3/2022

*Primary Examiner* — Suzanne L Barrett
(74) *Attorney, Agent, or Firm* — The Belles Group, P.C.

(57) ABSTRACT

A combination locking mechanism, particularly a strap lock that is secured via a rotary combination dial mechanism, is disclosed. The lock mechanism includes a clasp and a clasp receiver, and when locked, the clasp engages the clasp receiver creating a loop. The clasp receiver includes two sections, a body, and a latch member, both contained within a housing and creates a shear line between them. When the combination lock is in a locked condition at least two pins straddle the shear line and when in an unlocked condition the pins do not straddle the shear line. Contained within the body is the combination dial that includes a digit wheel and a pin receiver. After the user rotates the digit wheel to set a code for the unlocked condition, any other digit combination will put the lock in a locked condition.

15 Claims, 5 Drawing Sheets

(56) References Cited

U.S. PATENT DOCUMENTS

| | | | | |
|---|---|---|---|---|
| 8,919,155 | B2 * | 12/2014 | Lai | E05B 35/105<br>70/285 |
| 2006/0207301 | A1 * | 9/2006 | Yu | E05B 37/025<br>70/284 |
| 2010/0307204 | A1 | 12/2010 | Yu | |
| 2011/0083483 | A1 * | 4/2011 | Yang | E05B 37/0034<br>70/284 |
| 2012/0304711 | A1 * | 12/2012 | Misner | E05B 35/105<br>70/285 |

* cited by examiner

COMBINATION LOCKING MECHANISM

CROSS-REFERENCE TO RELATED APPLICATIONS

The present application claims priority to United Kingdom Patent Application No. 2218134.1, filed Dec. 2, 2022. The entirety of the aforementioned priority application is incorporated herein by reference in its entirety.

BACKGROUND

The present invention relates to a combination locking mechanism and relates particularly, but not exclusively, to a strap lock that is secured via a rotary combination dial mechanism.

Rotary combination dial locks are widely used for securing lock mechanisms such as a strap locks, padlocks or lock boxes. Combination locks are in general a lightweight but reliable method to secure items without the need for keys.

An example of this is using a combination lock connected to a strap for securing a bike to a bike rack. As a combination dial can contain vast numbers of numerical combination variations the user can be assured that their bike should be safe. However, there are a number of individuals who can unlock the strap lock without knowing the combination by understanding how the lock sounds or feels when a digit is correctly entered. This decreases the level of security of the lock and increases the level of uncertainty a user may feel when they are wanting to secure their personal possessions.

Preferred embodiments of the present invention seek to overcome or alleviate the above-described disadvantages of the prior art.

BRIEF SUMMARY

According to an aspect of the present invention there is provided a lock mechanism comprising a clasp and a clasp receiver for engaging and locking with each other, the clasp receiver comprising: a body; a latch member biased in a first direction by a first biasing member, wherein a boundary between said latch member and the body defines a shear line and one of the latch member and the clasp having at least one protrusion for selectively engaging the other of the latch member and the clasp in locking engagement; a plurality of first pins biased in a second direction transverse to the first direction by respective second biasing members, wherein the pins move between a locked condition, wherein the pins straddle the shear line, and an unlocked condition, wherein the pins do not straddle the shear line; and a plurality of combination dials at least partially contained in the body, the combination dials comprising a digit portion and a pin receiver portion, wherein each said combination dial has an unlocked rotational position in which the pin engages a first recess in the pin receiver moving the pin to the unlocked condition.

By providing a combination lock which utilizes pins straddling a shear line and connects a clasp to a clasp receiver, the advantage is provided a loop lock, such as a strap lock, chain lock or padlock, can be provided with an improved combination lock utilizing pins straddling the shear line. This type of combination lock, because it works differently from standard combination locks, is harder to overcome and presents different challenges to anyone attempting to interfere or open the lock without knowing the combination.

In a preferred embodiment the pin receiver portion further comprises a first aperture and at least one fixing device extending through the first aperture for securing the digit portion to the pin receiver portion. Having a fixing device for securing every clasp receiver to the digit portion increases the level of security for the combination device as all the fixing devices would have to be damaged or forcefully removed.

In another preferred embodiment the clasp receiver further comprises a blocking device biased in a third direction by a third biasing member, wherein when all the first pins are in the unlocked condition the blocking device is movable to allow access to the digit portion and enable manipulation of the fixing device and release the digit portion from the pin receiver portion thereby allowing the combination of the lock to be changed.

Unlike other combination dial locks this blocking device prevents access to the fixing member such as a screw when in a locked condition. This prevents any unlawful tampering with the fixing member and therefore avoids someone, other than the owner, changing the combination or unlocking the device. The blocking device also acts as a barrier to stop moisture or rain getting into the mechanism from the underside preventing rust build up around the fixing member and other moving parts such as the latch member which could cause it to get stiff or unusable.

In a further preferred embodiment at least one second pin is biased by a fourth biasing member in a fourth direction towards said combination dial wherein said combination dial comprises at least one second recess corresponding to each digit of said digit portion for engaging said second pin and said fourth biasing members act on said second pins with greater force than said second biasing members on the first pins.

Having a second pin acting on the digit portion for every turn of the digit portion masks the feeling and the sound of the first pin moving into place in the pin receiver. This provides an extra security feature and would deter someone tampering with the combination lock because it is more difficult to feel or hear the movement of the first pin. The recesses also act as an additional grip for the user when they are turning the digit portion.

In another preferred embodiment the second recesses are located on the digit portion. In an additional preferred embodiment, the first pins are split pins. In a preferred embodiment a pushing member is used to control the position of the latch member to release the clasp when all the pins are in an unlocked condition.

According to another aspect of the present invention there is provided a lock comprising: a mechanism as set out above; and a flexible connector connecting between the clasp and the clasp receiver, wherein the flexible connector comprises a strap.

In a further aspect of the present invention there is provided a lock mechanism comprising: a body; a latch member biased in a first direction by a first biasing member, wherein a boundary between the latch member and the body defines a shear line; a plurality of first pins biased in a second direction transverse to the first direction by respective second biasing members, wherein the first pins move between a locked condition, wherein the first pins straddle the shear line, and an unlocked condition, wherein the first pins do not straddle the shear line; a plurality of combination dials at least partially contained in the body, the combination dials comprising a digit portion and a pin receiver portion having a first aperture, wherein each combination dial has an unlocked rotational position in which the first pin engages with the pin receiver moving the first pin to the unlocked condition; at least one fixing device extending through the first aperture for rotationally securing the pin receiver portion to the digit portion; and a blocking device, wherein when all the pins are in an unlocked condition the blocking device is movable to allow the second aperture to align with the first aperture of the pin receiver portion and enable manipulation of the fixing device to release the digit portion from the pin receiver portion thereby allowing the combination of the lock to be changed.

By providing fixing devices for each of the combination dials and a blocking device the advantage is provided that the lock can only be changed by accessing them through the space created by the movement of the blocking device. Thus, a very secure mechanism, utilizing materials such as hardened steel for the blocking device, can be provided to prevent interference with the dials.

In a preferred embodiment the blocking device is biased in a third direction. In a preferred embodiment of the present invention the pins comprise split pins. In another preferred embodiment of the present invention a pushing member is used to control the position of the latch member to release the clasp when all the pins are in an unlocked condition.

In a further aspect of the present invention there is provided A lock mechanism comprising: a body; a latch member biased in a first direction by a first biasing member, wherein a boundary between the latch member and the body defines a shear line; a plurality of pins biased in a second direction transverse to the first direction by respective second biasing members, wherein the pins move between a locked condition, wherein the pins straddle the shear line, and an unlocked condition, wherein the pins do not straddle the shear line; a plurality of combination dials at least partially contained in the body, the combination dials comprising a digit portion and a pin receiver portion having a first aperture, wherein each the combination dial has an unlocked rotational position in which the first pin engages with a first recess of the pin receiver moving the first pin to the unlocked condition; and at least one second pin biased by a fourth biasing member in a fourth direction towards the combination dial wherein the combination dial comprises at least one second recess corresponding to each digit of the digit portion for engaging the second pin.

The fourth pins are used to prevent there being a perceivable difference in the feeling of the first pins engaging the correct position in the dial. In a preferred embodiment of the present invention the fourth biasing member acts on the second pin with a greater force than the second biasing member on the first pin. In another preferred embodiment of the present invention the at least one second recess is located on the digit portion. In a further preferred embodiment of the present invention the first and second pins comprise split pins.

BRIEF DESCRIPTION OF THE DRAWINGS

Preferred embodiments of the present invention will now be described, by way of example only, and not in any limitative sense with reference to the accompanying drawings in which.

DETAILED DESCRIPTION

Figure 1:
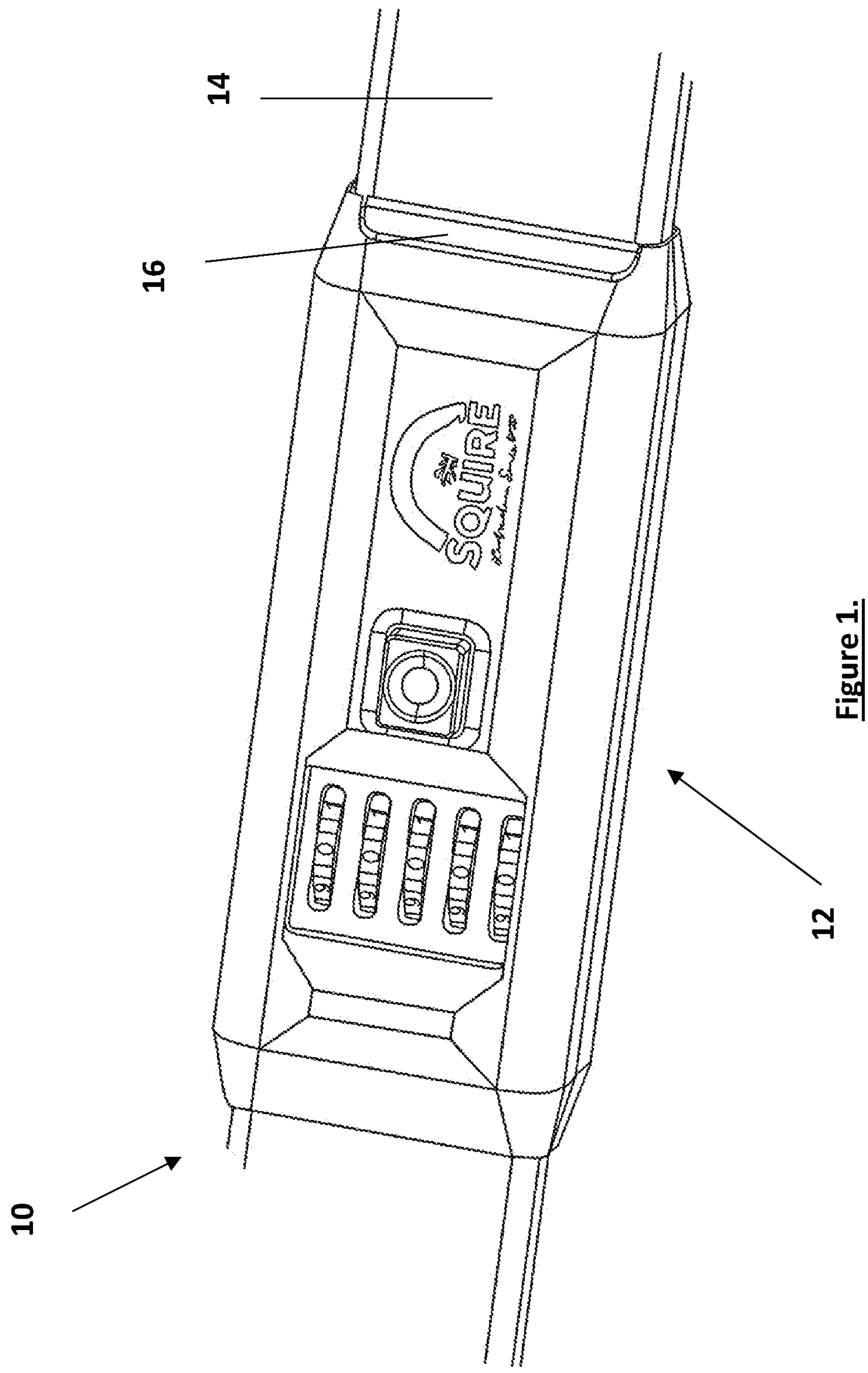
FIG. 1 is a planar view of a portion of a strap lock of the present invention.
Figure 2:
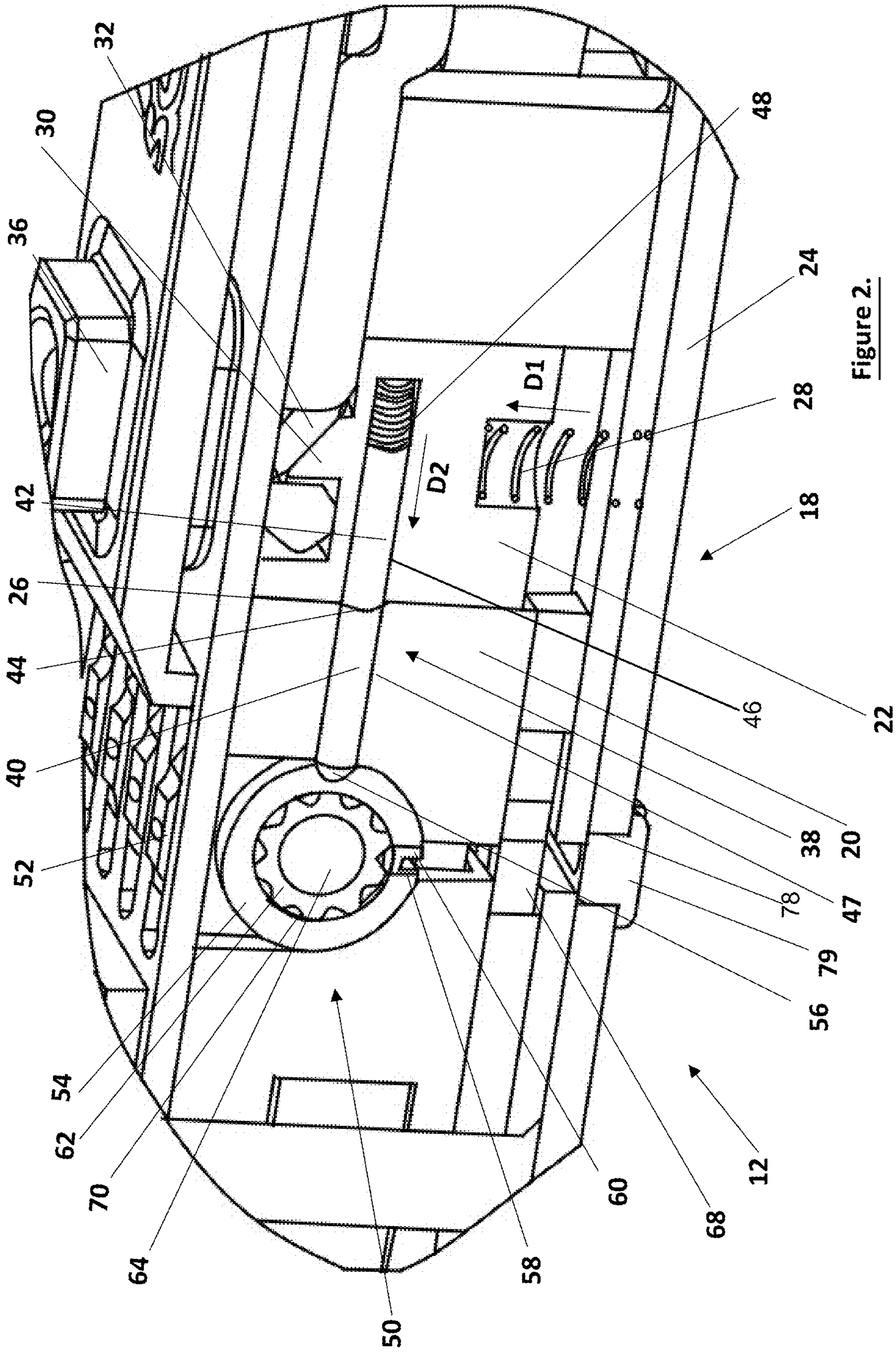
FIG. 2 is a sectional perspective view of a combination dial locking mechanism of the strap lock of FIG. 1.
Figure 3:
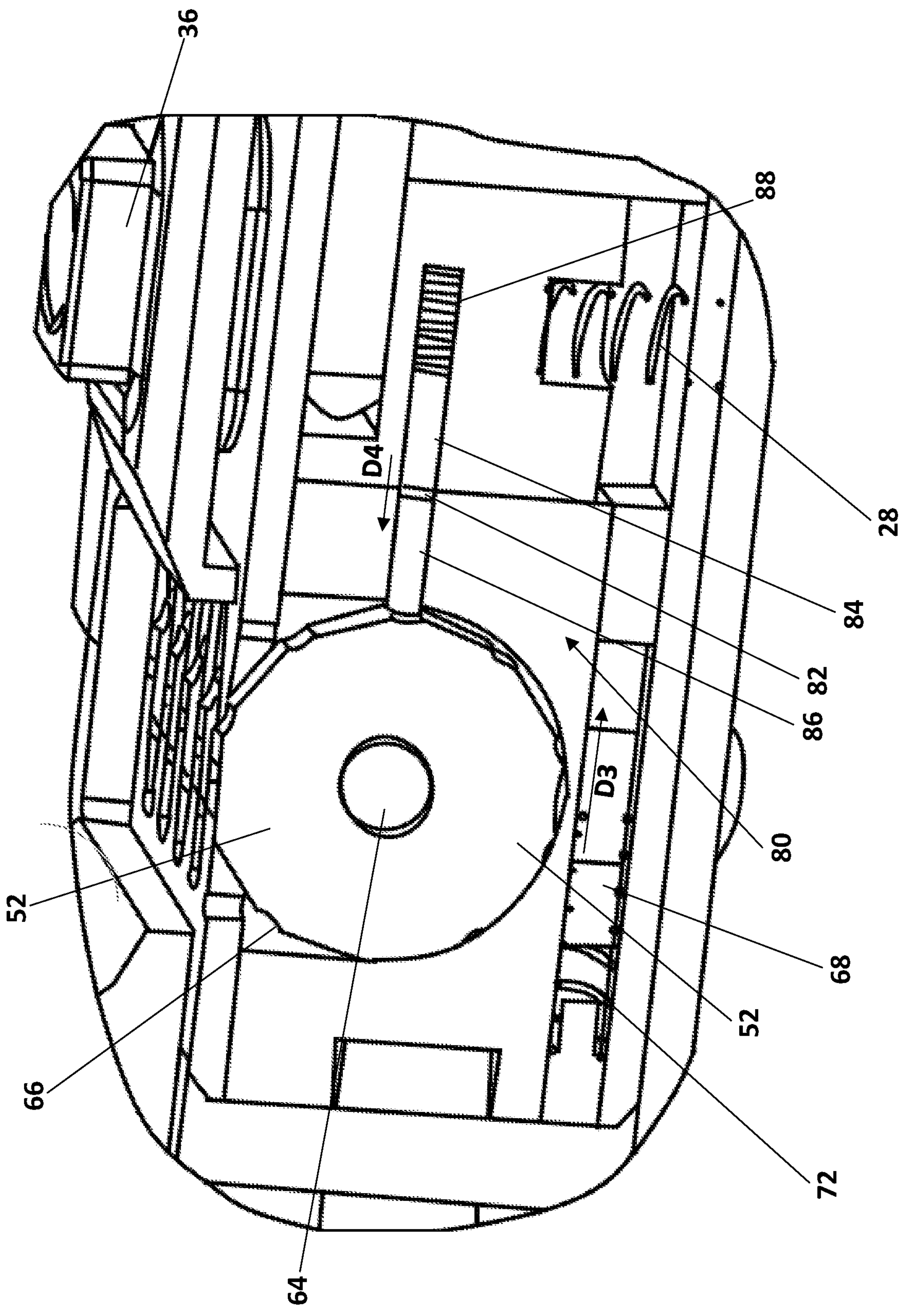
FIG. 3 is a sectional perspective view of the combination dial locking mechanism of FIG. 2.
Figure 4:
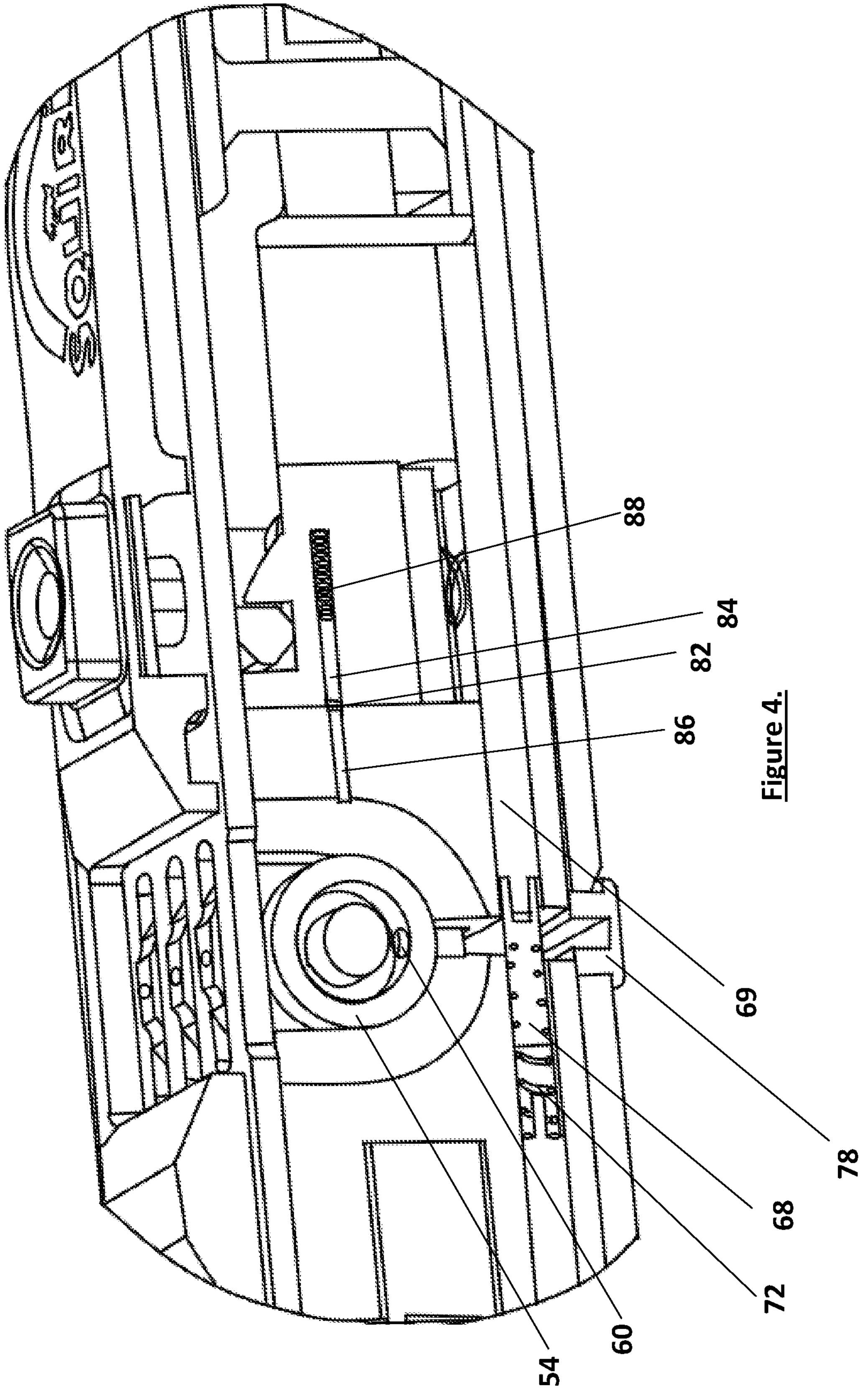
FIG. 4 is a sectional perspective view of a combination dial locking mechanism of the present invention.
Figure 5:
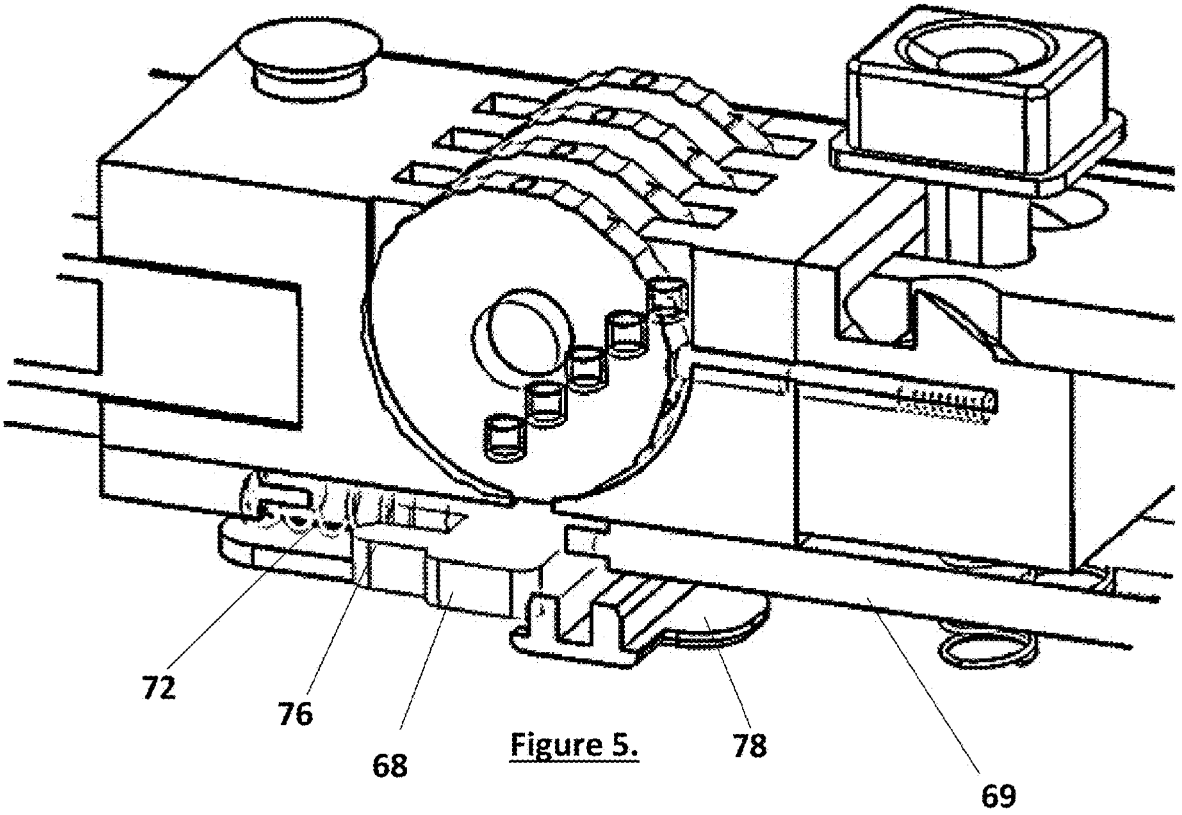
FIG. 5 is a transparent perspective view of a combination dial locking mechanism of the present invention.
Figure 6:
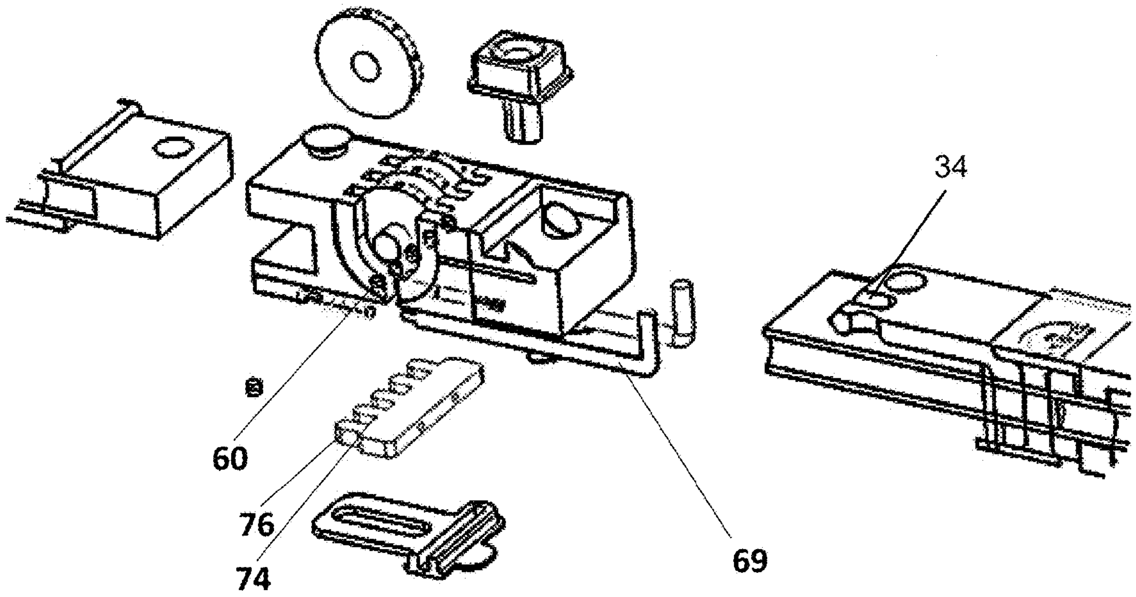
FIG. 6 is another transparent perspective view of a combination locking mechanism of the present invention.

Initially referring to FIG. 1 a combination strap lock 10 includes a locking mechanism 12 and a strap 14. At one end of the strap is a clasp 16 and the other end has a clasp receiver 18. When in a locked condition the clasp 16 engages with the clasp receiver 18 creating a loop with the strap 14. With additional reference to FIGS. 2 to 6 the clasp receiver includes two sections, a body 20 and a latch member 22 both contained within a housing 24. The latch member 22 and the body 20 form a shear line 26 between one another with the latch 22 biased in a first direction D1 by a first biasing member 28. When in a locked condition, a pair of first protrusions 30 located on the latch 22 enter into a pair of clasp recesses 32 on the clasp 16. It should be noted however that the first protrusions 30 could be located on the clasp 16 and the clasp recesses 32 located on the latch 22. Furthermore, the recesses and protrusions could be replaced by a single recess and protrusion like a seat belt tongue or by T-shaped bar that could hook around a pair of protrusions. In between the clasp recess 32 is a button recess 34 through which a mechanical button 36 makes contact with the latch member 22. In an unlocked condition the button 36 is pressed pushing down on the latch member 22 towards the first biasing member 28 and releasing the pair of first protrusions 30 from the clasp recesses 32 thereby releasing the clasp 16 from the clasp receiver 18.

Even though the button 36 is an integral part of the latch member 22 in the above embodiment, it could be a replaced by a separate button that would act indirectly with the latch member. This could be achieved via levers attached to the button and latch member 22. Once the button is pressed it would indirectly move the latch member 22 via these levers.

Located at the boundary between the latch member 22, and the body 20 are a plurality of first split pins 38 being biased by a second biasing member 48 in the form of a helical spring in a second direction D2. The first split pins 38 have a first left portion 40 and first right portion 42, forming a first coupling joint 44 when together. When in an unlocked condition the first right portion 42 is located within a first pin recess 46 within the latch 22 and the first left portion 40 is located within a first pin aperture 47 within the body 20. Furthermore, the first pins 38 do not straddle the shear line 26 and the coupling join 44 is in line with the shear line, allowing the latch 22 to move when the button 36 is pressed. When in a locked condition the first split pins 38 straddle the shear line 26, therefore the coupling join 44 is not in line with the shear line and the latch cannot move when the button 36 is pressed. When in a locked condition a proportion of the first left portion 40 crosses the shear line 26 thereby stopping the latch 22 from being moved when the button 36 is pressed. It is noted that in the above example split pins have been described. However, non-split pins with a longer biasing member that engages the end of the non-split pin could be used. In this instance, the shear line would be defined by the join between the non-split pin and the biasing member (spring).

Contained within the body 20 are a plurality of combination dials 50, in FIGS. 1 to 6 it can be seen that there are four combination dials. These combination dials 50 further include a digit portion 52 and a pin receiver portion 54. The digit portion 52 is a circular disk and includes the numbers 0 to 9 around the circumference with each digit having a second recess 66 either side. The digit portion 52 could also have any combination of letters, numbers or special characters around the circumference. The pin receiver portion 54 is an annular disk and includes a first recess 56 that engages with the first left portion 40 of the first split pins 38. The pin receiver 54 also includes a first aperture 58 and a first fixing device in the form of grub screw 60. The grub screw 60 extends through the first aperture 58 and makes contact with a second fixing device 62. The second fixing device 62 fits within the hole of the annular pin receiver portion 54 and is connected to the digit portion via a bar 64. The second fixing device 62 is gear shaped and has a third recess 70 corresponding to every digit on the digit portion 52. For example, if the digit portion has numbers 0 to 9 there are ten third recesses 70, one recess for every turn of the digit portion. When the grub screw 60 is inserted through the first aperture 58 of the pin receiver portion 54, the end or tip of the grub screw slots into one of the third recesses 70 of the second fixing device 62 whilst the body of the grub screw 60 is retained in the pin receiver portion 54. This secures the second fixing device 62 to the pin receiver portion and in turn secures the pin receiver portion 54 to the digit portion 52. Therefore, when the digit portion 52 is turned from one number to another the second fixing device 62 and pin receiver portion 54 also turn by the same proportion. When in a locked condition the grub screw 60 is inaccessible and is covered by a blocking device 68, whereby third apertures 78 are also located within the body adjacent the blocking device 68.

The blocking device 68 is made from a hardened steel and biased in a third direction D3 by third biasing members 72 in the form of a helical springs towards the latch member 22. It should be noted that even though D3 is parallel to D2 (although acting in the opposite direction), if the shape of the body was different or larger the springs could act on the blocking device transversely or at an angle relative to D2. The blocking device 68 also includes a series of finger recesses 74, with each finger recess corresponding to a single first aperture 58 on the pin receiver portion 54. That is, the transverse distance between each of the finger recesses 74 is the same as the transverse distance between each of the first apertures 58. This ensures that when the finger recesses 74 and first apertures are lined up, with the first apertures 58 above the finger recesses 74, they create unrestricted access between the base of the blocking device and the first apertures 58 to the grub screws 60. In between each finger recess 74 is a finger protrusion 76. These finger protrusions 76 are inserted part way into the third biasing members 72 so to move the blocking device 68 smoothly when in an unlocked condition. When in a locked condition the blocking device 68 is prevented from movement by the clasp 16. In particular, a blocking device extension 69, which is fixed to the blocking device 68, engages with the clasp 16 when the clasp 16 to prevent any movement of the blocking device until the mechanism 10 is unlocked and the clasp has been removed.

To allow the user access to the blocking device 68 there is a third aperture 78 at the base of the housing 24 that aligns with the finger recesses 74 of the blocking device when in an unlocked condition. When not in use this aperture 78 is concealed by a plug 79 that is removable.

The digit portion 52 also engages a second split pin 80. This second split pin 80 also includes a second right and left portion also forming a second coupling joint 82 when together. The second right portion 84 is adjacent a fourth biasing member 88 in the form of a spring located with the latch 22, biasing the second split pin 80 in a fourth direction D4 towards the digit portion 52. The second left portion 86 has a head that fits the shape of the third recess 70 of the digit portion 52. When the head of second split pin 80 engages the third recess 70, the second split pin does not straddle the shear line 26, between the latch 22 and the body 20, allowing the second coupling joint 82 to align with the shear line 26. With every turn of the digit portion 52 from one number to the next the head of the second split pin 80 will always have a recess to engage and therefore the second coupling joint 82 will align with the shear line 26. When the digit portion is moved in between two numbers (that is, the head of the second split pin is not engaging a third recess 70) the second coupling joint 82 will not be aligned with the shear line 26. Therefore, the second split pin 80 will be straddling the shear line preventing the latch 22 from moving.

These second split pins 80 are used as decoy split pins and are not important for locking the locking mechanism. The fourth biasing members 88 are stronger acting helical springs compared to the second biasing members 48 acting on the first split pins. When the digit portions 52 are turned from one number to the next, regardless of whether the combination is right the second split pins will always enter into a third recess 70, masking the sound and feel of the first split pins 38 entering into the first recess 56 of the pin receiver portion 54.

It should again be noted that even though D4 is in the same planar direction as D2 in the embodiment the second split pin could also be rotated or extend from another part of the body. For example, if the body 20 was slightly larger or a different shape, the second split pin 80 could be located transverse to the digit portion.

Referring again to FIG. 1 it can be seen that part of each digit portion 52 extends above the level of the housing 24. In this figure, three digits and two second recesses 66 are accessible, allowing a user to turn each digit portion 52. The second recesses 66 in this case are also used as gripping points for the user to rotate the numbers on the digit portion 52.

Operation of the locking mechanism will now be described. It should be noted that in FIGS. 2 to 4 the locking mechanism 12 is shown in an unlocked condition, in which all the first and second spit pins, 38 and 80, are not straddling the shear line 26 and their coupling joints, 44 and 82, are also aligned with the shear line 26. On receiving the strap lock 10 (initially in an unlocked condition) the user is prompted to change the numbers on the combination dials 50 to a four-digit code that they can easily remember, for example 1-2-3-4. The user will start by pushing the button 36 that forces the latch member 22 towards the first biasing member 28 and releases the clasp 16 from the clasp receiver 18. The user is then free to remove the plug 79 and gain access to the grub screws 60. The blocking device 68, initially having covered the grub screws 60 on the pin receiver portions 54, has now moved in the direction D4 with the clasp 16 having been released. The user can then use a screwdriver or other such device to release the grub screw 60 from the third recess 70 of the second fixing device 62, allowing free movement of the digit portion 52 from the pin receiver portion 54. The user is then able to rotate each wheel in turn until they have entered their combination, in this example the combination dials would read 1-2-3-4. Using the screwdriver, the user can screw all the grub screws 60 back through the pin receiver portions 54 and into their corresponding third recesses 70. With this achieved the strap lock

10 can only be unlocked using this combination. The user can input the clasp 16 back into the clasp receiver 18. This pushes the blocking device 68 back towards the third biasing member 72 covering the first apertures 58 of the pin receiver portions and thereby covering the grub screws 60. Once the clasp 16 is secured in the clasp receiver 18 the user replaces the plug 79 and can rotate the numbers to any combination, putting the strap lock 10 into a locked condition. The first split pins 38 will be straddling the shear line 26, preventing any movement of the latch member 22 when the button 36 is pushed on.

Once the combination 1-2-3-4 is entered into the combination dials 50 the first split pins 38 will no longer be straddling the shear line 26. Allowing movement of the latch 22 and therefore the release of the clasp 16 from the clasp receiver 18.

It will be appreciated by persons skilled in the art that the above embodiments have been described by way of example only and not in any limitative sense, and that various alterations and modifications are possible without departure from the scope of the protection which is defined by the appended claims. For example, although the above embodiment is being described as a strap lock it could be used in other situations such as a locking seatbelt or pram. The combination dial could be connected to a separate strap as opposed to being connected to the strap and the clasp receiver.

A further example is the biasing members are in the form of springs and more specifically helical springs, but they could be replaced by opposing magnets, or other type of springs such as a conical disk spring.

Another example is the strap could be replaced by a cable or chain.

A further example is the material of the blocking device is made from. It does not necessarily need to be made from a hardened steel, it could equally be made from a normal steel material or other such metal or plastic.

An additional example is the shape of the blocking device. As described in the embodiment above, the blocking device it has a series of finger protrusions and finger recesses however it would also work if the blocking device had a single recess, a series of apertures or had no recess or apertures but a single block of steel being removed from the locking mechanism or moved aside to allow access.

Another example could be replacing the blocking device and plug with a cam lock requiring a key to remove and therefore access the grub screw within the pin receiver.

The invention claimed is:

1. A lock mechanism comprising a clasp and a clasp receiver for engaging and locking with each other, said clasp receiver comprising:

a body;

a latch member biased in a first direction by a first biasing member, wherein a boundary between said latch member and said body defines a shear line and one of said latch member and said clasp having at least one protrusion for selectively engaging the other of said latch member and said clasp in locking engagement;

a plurality of first pins biased in a second direction transverse to said first direction by respective second biasing members, wherein said first pins move between a locked condition, wherein said first pins straddle said shear line, and an unlocked condition, wherein said first pins do not straddle said shear line; and a plurality of combination dials at least partially contained in said body, said combination dials comprising a digit portion and a pin receiver portion, wherein each said combination dial has an unlocked rotational position in which said pin engages a first recess in said pin receiver portion moving said pin to said unlocked condition.

2. A mechanism according to claim 1, wherein said pin receiver portion further comprises a first aperture and at least one fixing device extending through said first aperture for securing said digit portion to said pin receiver portion.

3. A mechanism according to claim 2, wherein said clasp receiver further comprises a blocking device biased in a third direction by a third biasing member, wherein when all said first pins are in said unlocked condition said blocking device is movable to allow access to said digit portion and enable manipulation of said fixing device and release said digit portion from said pin receiver portion thereby allowing the combination of the lock to be changed.

4. A mechanism according to claim 1 further comprising at least one second pin biased by a fourth biasing member in a fourth direction towards said combination dial wherein said combination dial comprises at least one second recess corresponding to each digit of said digit portion for engaging said second pin.

5. A mechanism according to claim 4 wherein said fourth biasing members act on said second pins with greater force than said second biasing members on said first pins.

6. A mechanism according to claim 1 wherein said second recesses are located on said digit portion.

7. A mechanism according to claim 1 wherein said first pins comprise split pins.

8. A mechanism according to claim 1 wherein a pushing member is used to control the position of said latch member to release said clasp when all said pins are in an unlocked condition.

9. A lock mechanism comprising:

a body;

a latch member biased in a first direction by a first biasing member, wherein a boundary between said latch member and said body defines a shear line;

a plurality of first pins biased in a second direction transverse to said first direction by respective second biasing members, wherein said first pins move between a locked condition, wherein said first pins straddle said shear line, and an unlocked condition, wherein said first pins do not straddle the shear line;

a plurality of combination dials at least partially contained in said body, said combination dials comprising a digit portion and a pin receiver portion having a first aperture, wherein each said combination dial has an unlocked rotational position in which said first pin engages with a first recess of said pin receiver moving said first pin to said unlocked condition;

at least one fixing device extending through said first aperture for rotationally securing said pin receiver portion to said digit portion; and a blocking device with at least one second aperture biased in a third direction, wherein when all the pins are in an unlocked condition the blocking device is movable to allow the second aperture to align with the first aperture of the pin receiver portion and enable manipulation of the fixing device to release the digit portion from the pin receiver portion thereby allowing the combination of the lock to be changed.

10. A mechanism according to claim 9 wherein said first pins comprise split pins.

11. A mechanism according to claim 9 wherein a pushing member is used to control the position of said latch member to release said clasp when all said pins are in an unlocked condition.

12. A lock mechanism comprising:

a body;

a latch member biased in a first direction by a first biasing member, wherein a boundary between said latch member and said body defines a shear line;

a plurality of pins biased in a second direction transverse to said first direction by respective second biasing members, wherein said pins move between a locked condition, wherein said pins straddle said shear line, and an unlocked condition, wherein said pins do not straddle the shear line;

a plurality of combination dials at least partially contained in said body, said combination dials comprising a digit portion and a pin receiver portion having a first aperture, wherein each said combination dial has an unlocked rotational position in which said first pin engages with a first recess of said pin receiver moving said first pin to said unlocked condition; and at least one second pin biased by a fourth biasing member in a fourth direction towards said combination dial wherein said combination dial comprises at least one second recess corresponding to each digit of said digit portion for engaging said second pin.

13. A mechanism according to claim 12, wherein said fourth biasing member acts on said second pin with a greater force than said second biasing member on said first pin.

14. A mechanism according to claim 12 wherein said at least one second recess is located on said digit portion.

15. A mechanism according to claim 12 wherein said first and second pins comprise split pins.

* * * * *